G. J. COSTELLO.
LATHE.
APPLICATION FILED OCT. 30, 1909.
1,045,524.
Patented Nov. 26, 1912.
3 SHEETS—SHEET 1.
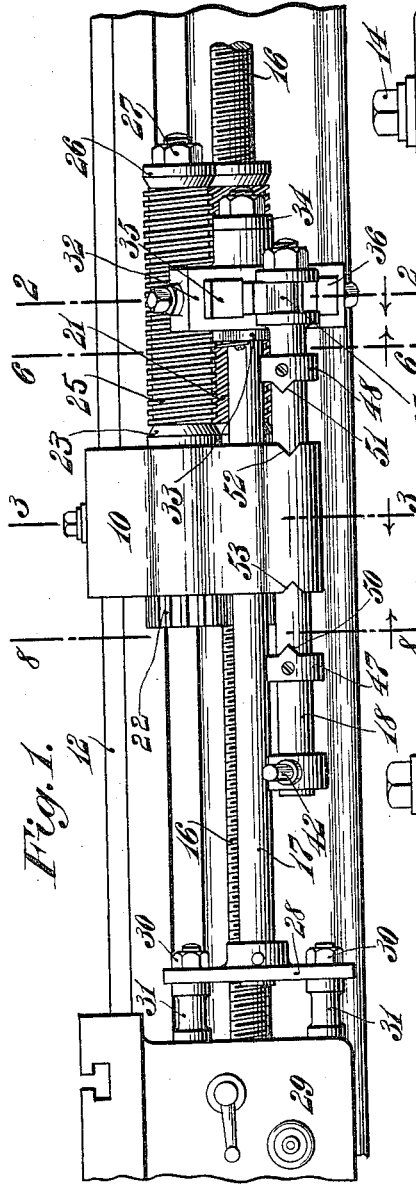
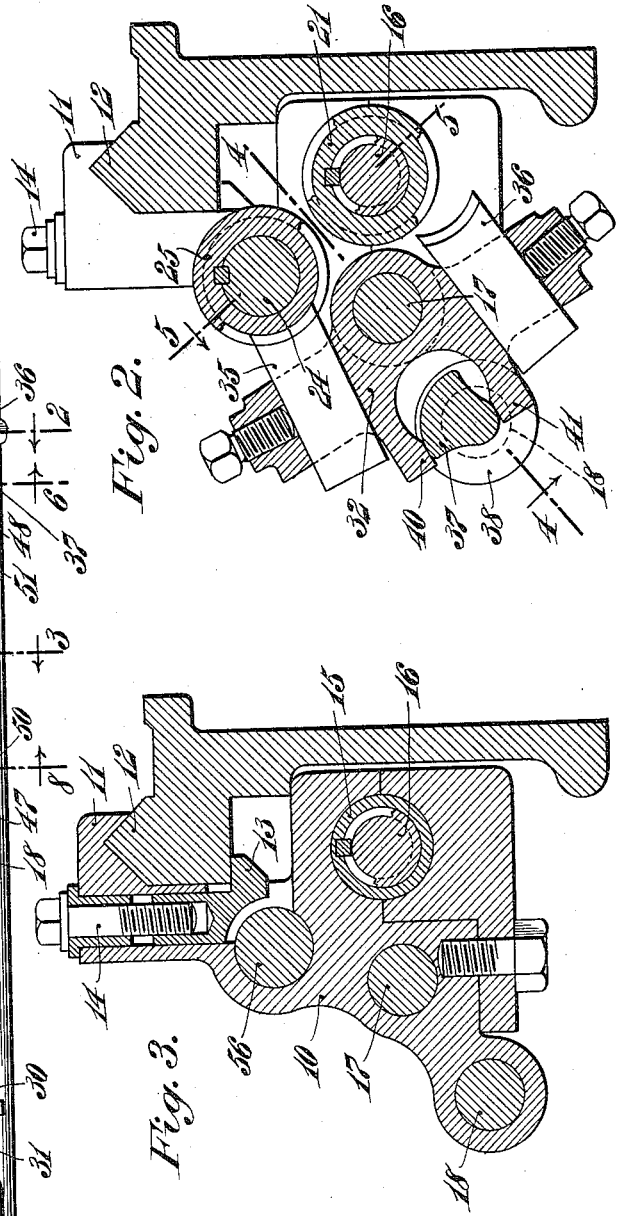
WITNESSES:
Jas. C. Wobensmith
Mae Hofmann
INVENTOR
George J. Costello,
BY
[signature]
ATTORNEY.

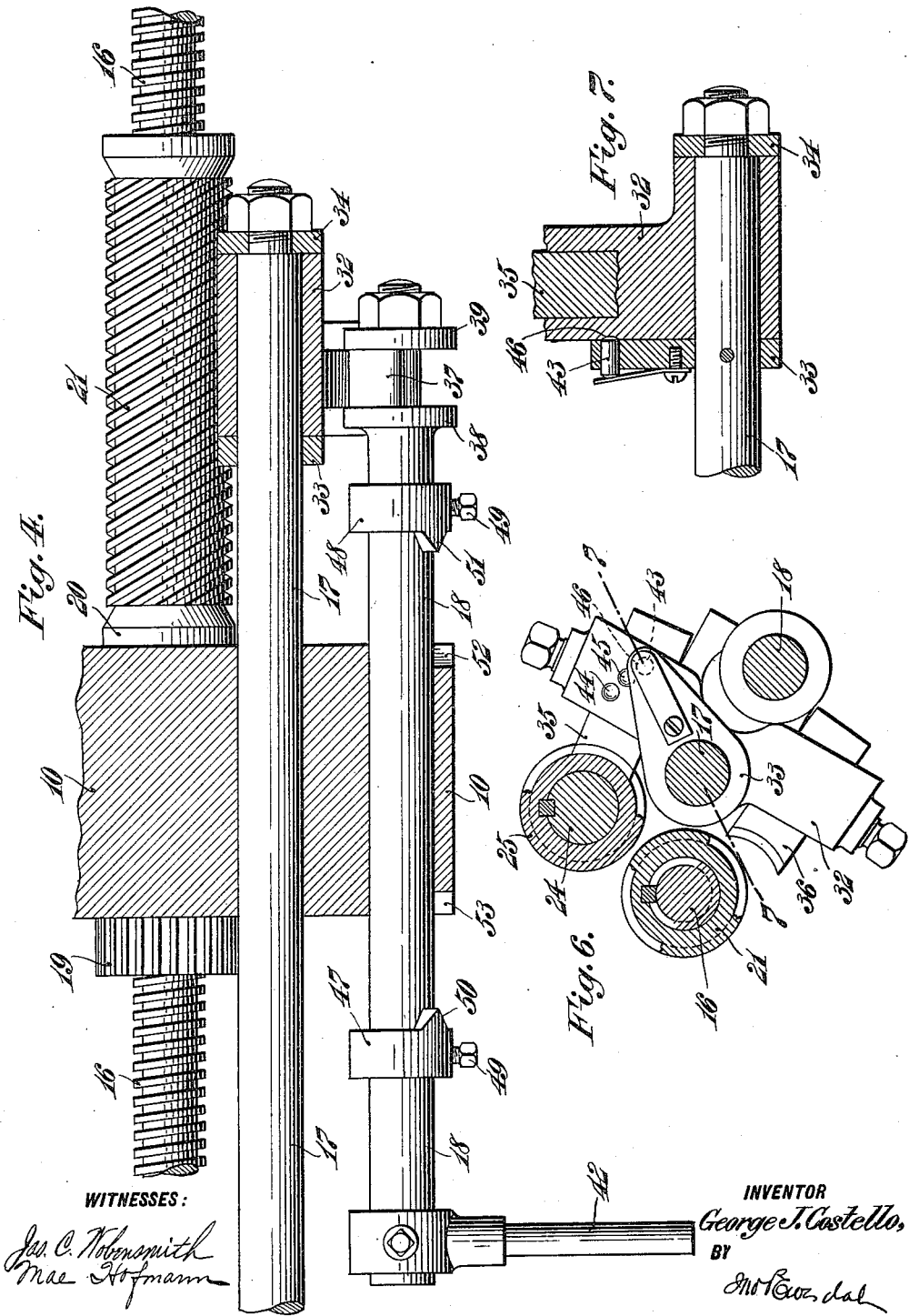

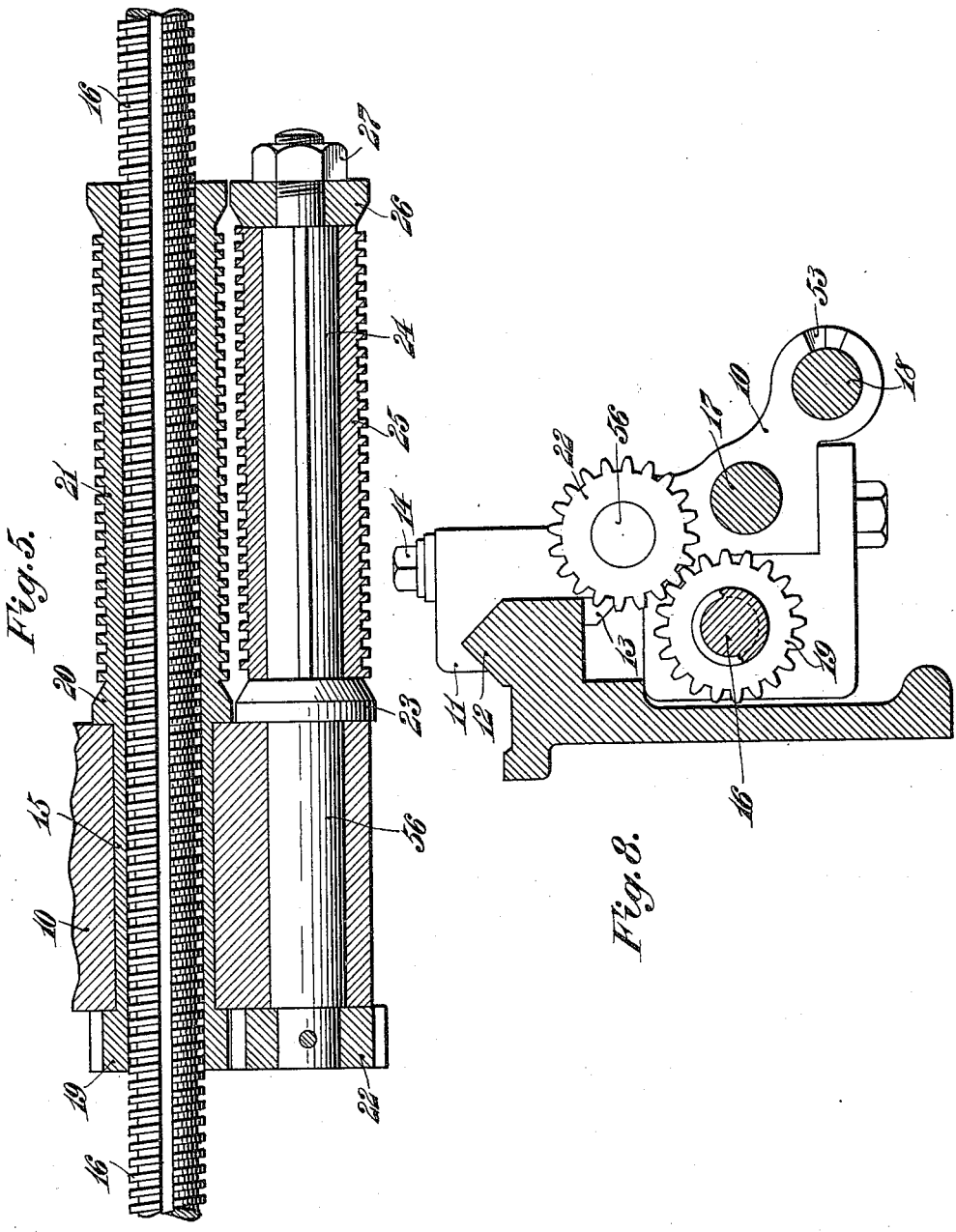

UNITED STATES PATENT OFFICE.

GEORGE J. COSTELLO, OF PHILADELPHIA, PENNSYLVANIA.

LATHE.

1,045,524.  Specification of Letters Patent.  Patented Nov. 26, 1912.

Application filed October 30, 1909. Serial No. 525,542.

*To all whom it may concern:*

Be it known that I, GEORGE J. COSTELLO, a citizen of the United States, residing in Philadelphia, in the county of Philadelphia and State of Pennsylvania, have invented a new and useful Lathe, of which the following is a specification.

My invention relates to improvements in lathes.

The object is to provide improved means for actuating the carriage both in the cutting movement and in the return movement.

My invention comprises means for actuating the carriage at any desired rate of speed in the cutting direction, and at the maximum rate of speed, in the return movement, consistent with the speed of travel of the lathe.

My invention also comprises a self-contained mechanism which may be disengageably attached to a standard lathe.

Referring to the drawings:—Figure 1 is a front elevation of my device. Fig. 2 is a vertical cross-section on line 2—2 of Fig. 1. Fig. 3 is a vertical cross-section on line 3—3 of Fig. 1. Fig. 4 is a longitudinal section on line 4—4 of Fig. 2. Fig. 5 is a longitudinal section on line 5—5 of Fig. 2. Fig. 6 is a cross section on line 6—6 of Fig. 1. Fig. 7 is a longitudinal section on line 7—7 of Fig. 6. Fig. 8 is a cross section on line 8—8 of Fig. 1.

Similar numerals refer to similar parts throughout the several views.

Referring particularly to Figs. 1 and 3, 10 represents a bearing block which is provided at its upper end with a hook or lug 11 for removably securing the bearing block 10 to the V-way 12 of the lathe bed. The clamping nut 13 operated by the bolt 14 serves to maintain the block in the desired position on the lathe. The bearing block 10 is provided with a journal box so located as to form a bearing for the sleeve 15 which surrounds and is keyed to the lead-screw 16. The bearing block is also provided with bearings for the countershaft 56, the carriage actuating rod 17 and the cam shaft 18.

The sleeve 15 is provided with the gear 19 at one end, on one side of bearing block 10, and with the collar 20 at the other side of the bearing block. The balance of the sleeve member 15 is provided with a thread 21 of any suitable pitch.

The countershaft 56 is provided at one end with the gear 22, which meshes with gear 19. On the other side of the bearing block said countershaft has the shoulder 23, and beyond the shoulder 23 it is continued in the form of the spindle 24 on which is keyed the sleeve 25, provided with a thread of any suitable pitch. This sleeve 25 is removably held in place by the collar 26 and nut 27.

The carriage-actuating rod 17 is slidably supported in the bearing block 10 and is secured at one end to the yoke 28 which is bolted to the lathe carriage 29. The yoke 28 is secured by means of nuts 30 to the posts 31, which are tapped into the end of carriage 29. This structure is employed in order to permit the carriage actuating rod 17 to be secured to the lathe carriage without interfering with such of the operating parts thereof as might happen to come at the point of engagement of rod 17 with the carriage 29. On the other end of the carriage-actuating rod 17 is rotatably mounted the yoke member 32 between the collars 33 and 34. The yoke 32 carries the half nuts 35 and 36 which are adapted to have alternative engagement with the threaded sleeves 21 and 25 respectively.

The cam shaft 18 is slidably and rotatably supported in the bearing block 10. This cam shaft 18 is provided with the cam 37 and the collars 38 and 39, said collars embracing a projection of yoke 32 to prevent longitudinal movement between the cam shaft and said yoke. The cam 37 is adapted to coöperate with the embracing arms 40 and 41 of the yoke member 32, to cause the rocking of the yoke 32 to bring either nut 35, or nut 36 into engagement with its coöperating threaded sleeve, or else to hold said nuts out of said engagement. The cam shaft is oscillated by means of the handle 42 to throw one or the other of said half-nuts into engagement with the corresponding screw sleeve, and is yieldingly held in either of said positions, or in neutral position with both half nuts out of engagement, by a spring-pressed pin 43, carried at the end of an arm 33 secured to the cam shaft and adapted to engage in any one of three recesses 44, 45, and 46, formed in the side of yoke 32. On the cam shaft 18 is also provided a pair of collars 47 and 48, adjustably secured to said shaft by the set-screws 49. These collars are provided with the V-shaped projections 50 and 51, which are adapted to engage with the V-shaped recesses 52 and 53, respectively, in the bearing block 10. The purpose of such engagement is to automatically rotate the cam shaft at the end of the cutting and return movements to disengage the half nuts from their coöperating threaded sleeves; the adjustment being provided to secure any required length of work.

It will be noted that the spindle 24 provides a convenient means for changing the threaded sleeve 25, this sleeve being the feed sleeve for actuating the carriage in the cutting movement. It will be understood that a number of such sleeves are provided each with a thread of different pitch, so that the sleeve of the required pitch is readily selected and put in place for securing the cutting of a corresponding thread on the lathe.

The thread 21 on the sleeve 15 is of relatively coarse pitch, for the quick return of the carriage to initial position, after each cutting movement. This sleeve 15 is also removable and may be replaced from time to time with a sleeve having a thread of different pitch; the object being to use a return threaded sleeve of such pitch, as to secure the maximum speed of return consistent with the speed of the lathe. Hence it will be seen, that my invention provides convenient means, for employing removable feed and return sleeves having screw threads, of such relative pitch, with respect to each other and with respect to the speed of the lathe, as shall secure a wide range of desired results, with the minimum of trouble.

What I claim is:—

1. In combination with a lathe, a threaded sleeve removably connected with the lead screw and carrying a gear, a countershaft geared therewith, a threaded sleeve removably connected with the countershaft, and means for establishing operative relationship between the carriage and the two threaded sleeves alternately.

2. In combination with a lathe, a threaded sleeve mounted on and keyed to the lead screw, a countershaft parallel to the lead screw, a threaded sleeve removably mounted on and keyed to said countershaft, intermeshing gears mounted on said first mentioned sleeve and said countershaft, respectively, and means for establishing operative relationship between the carriage and the two threaded sleeves alternately.

3. In combination with a lathe, a threaded sleeve keyed on the lead screw, a countershaft mounted parallel to and geared to said sleeve, a threaded sleeve adapted to be mounted on the counter-shaft, and means for establishing operative relationship between the carriage and the threaded sleeve and a second threaded sleeve of different pitch alternately.

4. In combination with a lathe, a threaded sleeve connected with the lead screw, a countershaft geared with said sleeve, said countershaft adapted to carry one of a number of interchangeably threaded sleeves of different pitch, a carriage actuating shaft, a pair of half nuts and a yoke for supporting the same connected with the actuating shaft, a manually operated cam shaft and a cam actuated thereby for actuating the yoke to cause the engagement of the half nuts alternately with the said threaded sleeves.

5. A self-contained mechanism adapted to be removably connected with a lathe, said mechanism comprising a bearing block having means of attachment to the ways, a threaded sleeve adapted to be mounted on the lead screw to rotate therewith but held from longitudinal movement by said block, a countershaft journaled in said block, a second threaded sleeve removably mounted on said countershaft, a pair of half-nuts operatively connected to the carriage and means to engage them alternately with said sleeves.

6. A self-contained mechanism adapted to be removably connected with a lathe, said mechanism comprising a bearing block having means of attachment to the ways, a threaded sleeve adapted to be mounted on the lead screw to rotate therewith but held from longitudinal movement by said block, a countershaft journaled in said block, a rod connected to the carriage, a yoke mounted to rock on said rod, a pair of half-nuts carried by said yoke in position to alternately engage said sleeve respectively and a cam shaft journaled in said block constructed and adapted to rock said yoke.

7. A self-contained mechanism adapted to be removably connected with a lathe, said mechanism comprising a bearing block having means of attachment to the ways, a threaded sleeve adapted to be mounted on the lead screw to rotate therewith but held from longitudinal movement by said block, a countershaft journaled in said block, a rod connected to the carriage, a yoke mounted to rock on said rod, a pair of half-nuts carried by said yoke in position to alternately engage said sleeves respectively, a cam shaft journaled in said block, means carried by said shaft and coöperating with said block to turn said shaft at the ends of the carriage travel, and a cam carried by said shaft adapted to co-act with said block to rock said yoke.

8. A self-contained mechanism adapted to be removably connected with a lathe, said mechanism comprising a bearing block having means of attachment to the ways, a threaded sleeve journaled in said block against endwise movement and adapted to be rotatably connected to the lead screw, a countershaft journaled in said block and removably carrying a second threaded sleeve, a rod connected to the carriage, a yoke mounted to rock on said rod, half-nuts carried by said yoke and adapted to engage said sleeves alternately, a cam shaft also journaled in said block and having means whereby it may be manually actuated, and a cam on said cam shaft engaging said yoke to rock the same, said cam shaft and block having respectively coöperating cam surfaces whereby the former is automatically rocked to disengage either of said half-nuts at the end of the travel of the carriage.

9. In combination with a lathe, mechanism connected therewith, comprising a removable feed screw sleeve and a return screw sleeve, means for supporting the same, including a bearing block and means for clamping said block to the lathe bed, means establishing operative relationship between the carriage and feed screw sleeve and return screw sleeve alternately, including an actuating shaft connected with the carriage and supported by the bearing block, half nuts, a supporting yoke therefor connected with the shaft, and means for rocking the yoke.

GEORGE J. COSTELLO.

Witnesses:
MAE HOFMANN,
HOWARD S. OKIE.

Copies of this patent may be obtained for five cents each, by addressing the "Commissioner of Patents, Washington, D. C."